United States Patent [19]

Stenton

[11] Patent Number: 5,666,198
[45] Date of Patent: Sep. 9, 1997

[54] APPARATUS FOR ALIGNING A REFERENCE REFLECTOR WITH A FOCAL POINT OF AN OPTICAL INSTRUMENT

[75] Inventor: Conrad Stenton, Midland, Canada

[73] Assignee: Hughes Electronics, Los Angeles, Calif.

[21] Appl. No.: 637,989

[22] Filed: Apr. 25, 1996

[51] Int. Cl.$^6$ ........................................ G01B 9/02
[52] U.S. Cl. ........................................ 356/360; 356/345
[58] Field of Search ........................... 356/359, 360, 356/345

[56] References Cited

U.S. PATENT DOCUMENTS 4,201,473  5/1980  Domenicali et al. ............... 356/360

*Primary Examiner*—Frank G. Font
*Assistant Examiner*—Robert Kim
*Attorney, Agent, or Firm*—Gordon R. Lindeen III; Michael W. Sales; Wanda K. Denson-Low

[57] ABSTRACT

A video camera (28) is provided including an image receiving surface (30). A monitor (36) is operably coupled to the video camera (28) to display an image (34) received at the image receiving surface (30). A reference reflector (24) is secured to the alignment camera (28) such that a reference portion (40) of the image receiving surface (30) is located at the optical center of curvature (32) of the reference reflector (24). An alignment mark (44) is coordinately positioned with the reference portion (40) on the monitor (36). The video camera (28) and the reference reflector (24) are movable as a unit to position the optical center of curvature (32) of the reference reflector (24) coincident with the focal point 22 of an element or optical system to be tested (18).

14 Claims, 3 Drawing Sheets

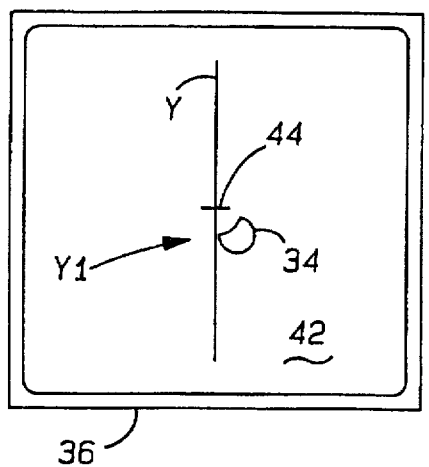
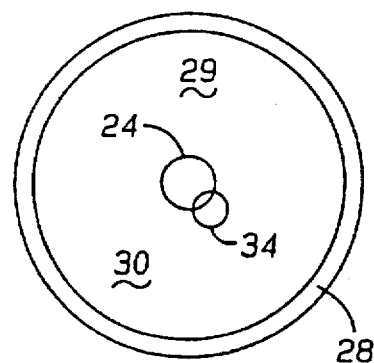
Fig-7A  Fig-7B
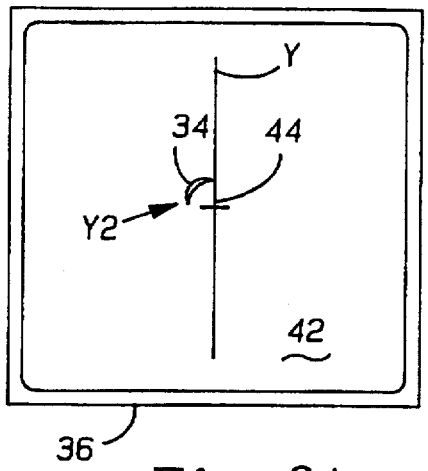
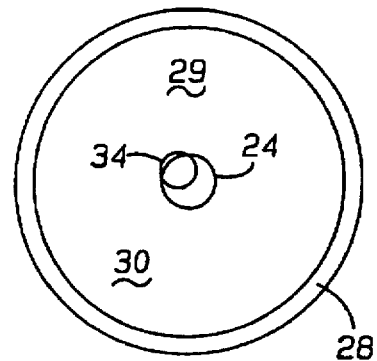
Fig-8A  Fig-8B
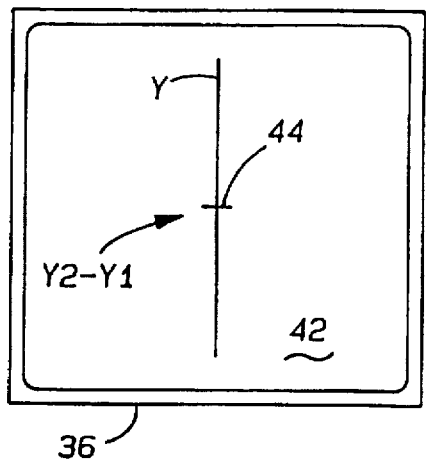
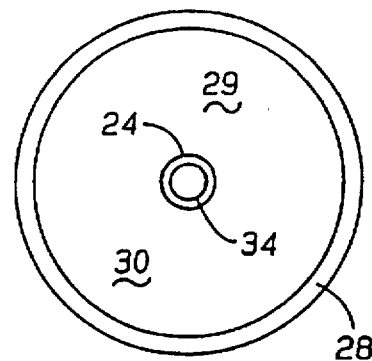
Fig-9A  Fig-9B

APPARATUS FOR ALIGNING A REFERENCE REFLECTOR WITH A FOCAL POINT OF AN OPTICAL INSTRUMENT

BACKGROUND OF THE INVENTION

1. Technical Field

This invention generally relates to optical systems for interferometric testing. More particularly, the present invention relates to an apparatus for aligning a reference reflector.

2. Discussion

As is generally known in the art of interferometry, there exists a very small acceptance angle wherein an image of the element or optical system to be tested can be captured for testing by an interferometer. Therefore, it is essential that the optical center of curvature of a reference reflector used in the testing procedure be positioned coincident with the focal point of the element or optical system to be tested. In this way, radiation returned from the reference reflector is reflected back to the interferometer wherein critical alignment may be performed. However, known interferometric testing systems do not possess means for accurately and conveniently locating the focal point of the element or optical system to be tested or means for positioning the reference reflector thereto. Moreover, such systems do not possess means for readily communicating to the optician the degree to which a reference reflector is misaligned.

Previously, alignment of the optical center of curvature of the reference reflector with the focal point of an element or optical system to be tested required a large degree of optician skill and experience. Conventional alignment of the reference reflector is accomplished by trial and error using pin holes, cards and other clues. These aids are not secured to the reference reflector and generally do not provide the optician with a large quantity of system feedback. Therefore, the optician must coordinate movement of two devices and rely on experience to quickly find the focal point of the element or optical system to be tested and align the optical center of curvature of the reference reflector thereto.

Furthermore, testing an element or optical system located within the interior of a complex system such as a telescope, high altitude camera or missile seeking system according to the prior art is cumbersome and inefficient. A reference reflector is often supported on a long wand and entered into the interior of the system. The wand is moved about until the reference reflector contacts radiation passing from the element or optical system to be tested. As is often the case, finding this radiation is generally by chance. After the radiation is located, the optical center of curvature of the reference reflector is positioned to the focal point of the element or optical system to be tested by optician skill and experience.

SUMMARY OF THE INVENTION

The above and other objects are provided by incorporating a video camera into an optical system for interferometric testing using a reference reflector. The video camera includes an image receiving surface having a reference portion thereon. The reference reflector is secured to the video camera in a manner such that the reference portion of the image receiving surface is located essentially at the optical center of curvature of the reference reflector. A display monitor is operably coupled to the video camera. The video camera and reference reflector are movable as a unit to position the optical center of curvature of the reference reflector coincident with the focal point of the element or optical system to be tested.

BRIEF DESCRIPTION OF THE DRAWINGS

FIG. 4b is a front schematic view of a display monitor including an image thereon in the misaligned condition of FIG. 4a.

FIG. 5b is a front schematic view of a display monitor including an image thereon in the misaligned condition of FIG. 5a.

FIG. 6b is a front schematic view of a display monitor including an image thereon in the properly aligned condition of FIG. 6a.

FIG. 7a is a front schematic view of a display monitor including a partially obscured image thereon according to the present invention.

FIG. 7b is a front schematic view of an image receiving surface including an image partially on the reference reflector and partially on the image receiving surface.

FIG. 8a is a front schematic view of a display monitor including a partially obscured image thereon according to the present invention.

FIG. 8b is a front schematic view of an image receiving surface including an image partially located on the reference reflector and partially on the image receiving surface.

FIG. 9a is a front schematic view of a display monitor according to the present invention.

FIG. 9b is a front schematic view of an image receiving surface including an image completely located on the reference reflector.

DETAILED DESCRIPTION OF THE PREFERRED EMBODIMENTS

Figure 1:
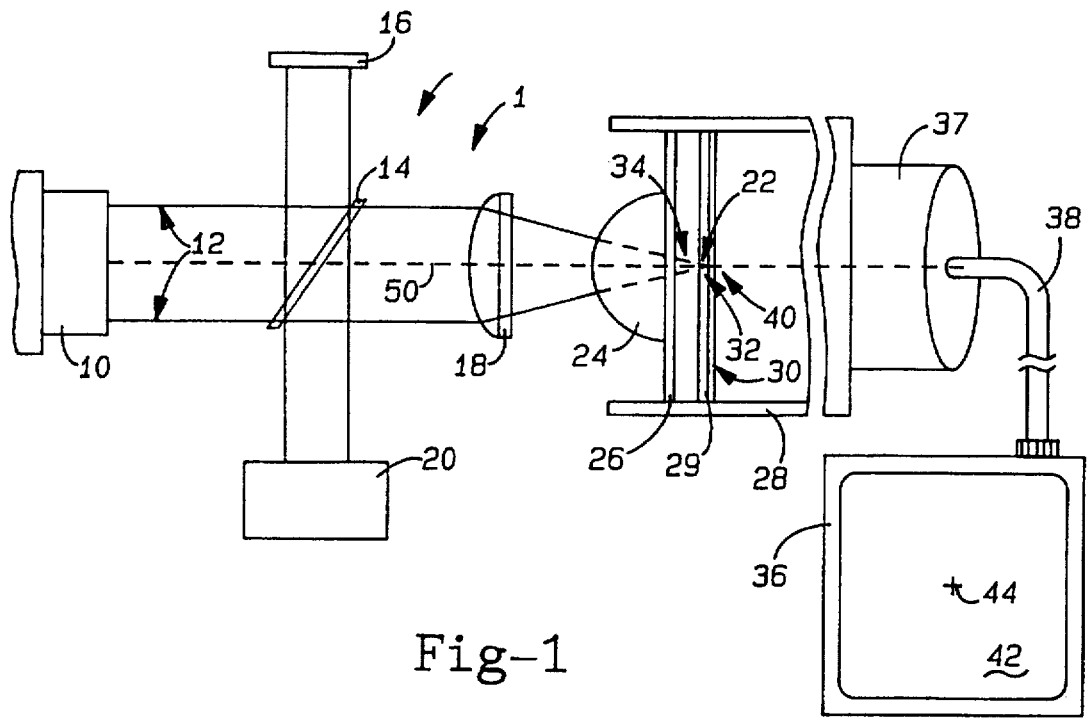
FIG. 1 is a top schematic view of an optical system for interferometric testing including an alignment camera according to the present invention and a front schematic view of a display monitor associated therewith.

In FIG. 1, an optical system for interferometric testing implementing the present invention is shown generally at 1. An interferometer for capturing, critically aligning and testing an image 34 is generally indicated at 2. As is known in the art of interferometry, to obtain proper interference information it is essential to position the optical center of curvature 32 of the reference reflector 24 coincident with the focal point 22 of the element or optical system to be tested, e.g., lens 18. In this way, the reference reflector 24 returns the radiation 12 to the interferometer 2 such that it may be captured for critical alignment and testing. The present invention provides a means for quickly and easily locating the focal point 22 of an element or optical system to be tested 18 and positioning the optical center of curvature of the reflector 24 therewith. Furthermore, the complexity, time and skill required to achieve alignment are reduced.

Still referring to FIG. 1, a light source 10, such as a laser, projects a beam of radiation 12 to a beam splitter 14. As is known in the art, a lens or other elements may be inserted between the light source 10 and the beam splitter 14 to ensure that the rays of radiation 12 are parallel. It should be noted that while the present invention is shown implemented in a Twyman-Green interferometer, it is suitable for use in any system requiring alignment of a reference reflector. The beam splitter 14 reflects half of the radiation 12 to the reflector 16 and permits the other half to pass on to an element or optical system to be tested, in this case, lens 18. Although lens 18 is shown, other elements or complete optical systems could be substituted therefore, such as but not limited to, other lenses, prisms, or optical flats. The reflector 16 reflects the radiation 12 back to the beam splitter 14 and on to the interference viewing screen or detector 20.

The radiation 12 from the light source 10 which passes through the beam splitter 14 is converged by the lens 18 to a focal point 22. A reference reflector 24 is secured to a cover plate 26 of a video camera 28. The cover plate 26 serves to protect an image receiving surface 30 from damage through scratching or otherwise. As described in greater detail below, the optical center of curvature 32 of the reference reflector 24 is shown in FIG. 1 to be positioned coincident with the focal point 22 of the lens 18.

An image 34 is formed on the image receiving surface 30 and is communicated from the video camera 28 to a display monitor 36 by the cable 38 as is known in the video art. The cable 38 can be any suitable video cable such as a coaxial cable. Likewise, the display monitor 36 can be any type of monitor such as a cathode-ray tube.

The reference reflector 24 reflects the radiation 12 back through the lens 18 and onto the beam splitter As is known, a compensator (not shown) may be inserted between the reference reflector 24 and the beam splitter 14 to ensure symmetry. The beam splitter 14 partly reflects the radiation 12 to the detector 20. Thus, the radiation reflected from the reflector 16 interferes with the radiation reflected from the reference reflector 24 and the fringe pattern thereof is viewable on the detector 20. In this way, any deformities of the lens 18 are displayed in the fringe pattern and an optician may then address the deformities accordingly, as by further polishing.

Figure 2:
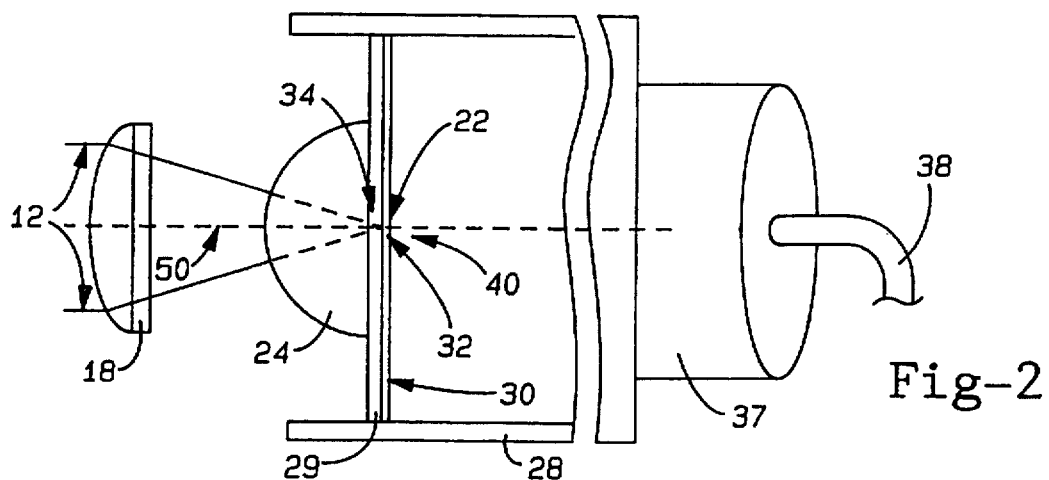
FIG. 2 is a top schematic view of an element to be tested and an alignment camera according to the present invention.

Turning to FIG. 2, the video camera 28 will now be described in greater detail. The video camera 28 is shown with a convex reference reflector 24 secured thereto. It should be noted that the video camera 28 of the present invention can also be used in conjunction with reference reflectors of varying geometries including concave, convex and flat configurations. However, it has been determined that while the present invention performs adequately with any of the above mentioned geometries, it is particularly well suited for use in conjunction with convex reflectors.

In the embodiment shown in FIG. 2, the reference reflector 24 is secured to an image plate 29 to which the image receiving surface 30 is fixed. However, as shown in FIG. 1, the reference reflector 24 may also be secured to the protective cover plate 26 suspended above the image plate 29 and the image receiving surface 30. The cover plate 26 may be glass or other suitable material as is known in the camera art. In either case, the reference reflector 24 is secured to the video camera 28 in a manner so that a reference portion 40 of the image receiving surface 30 is located essentially at the optical center of curvature 32 of reflector 24.

Figure 3:
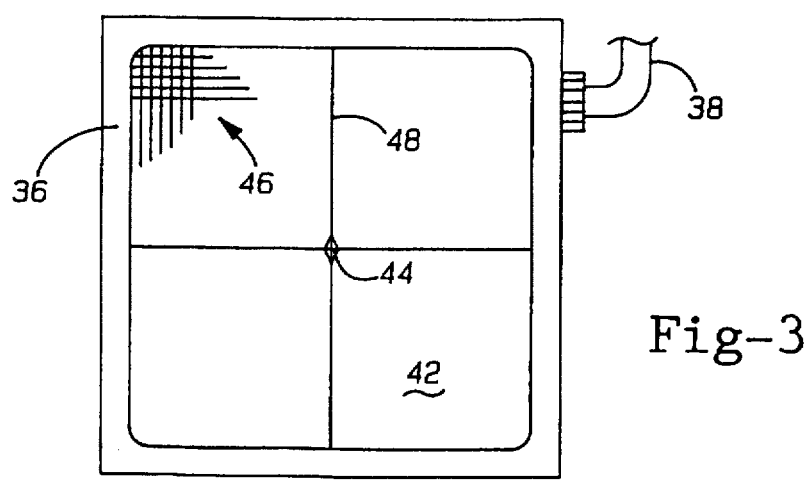
FIG. 3 is a front schematic view of a display monitor including an alignment grid and reference indicia according to the present invention.

Referring to FIGS. 2 and 3, the lens 18 converges the radiation 12 to a focal point 22. The radiation 12 strikes the image receiving surface 30 and forms the image 34 thereon. The image receiving surface 30 communicates the image 34 to the display monitor 36 by the cable 38.

An alignment mark 44 is provided on the display screen 42. The alignment mark 44 may be a piece of tape, an ink mark or other suitably viewable indicia preferably coordinately positioned with the reference portion 40 of the image receiving surface 30. In this way, an image 34 focused and positioned on the alignment mark 44 is also focused and positioned on the reference portion 40 of the image receiving surface 30. An alignment grid 46 or cross-hairs 48 may also be incorporated into the screen 42 independently or in combination with the alignment mark 44.

The particular video camera 28 used in the present invention is not critical so long as it supports the reference reflector 24 adequately and affords ample viewing of the image 34. However, because the present invention is well suited for use in testing elements or complete optical systems which are located in the interior of complex systems such as telescopes, high altitude cameras and missile seekers, a miniature camera has been determined to be particularly advantageous. If necessary, the video camera 28 may be suspended from a long wand 37 for this purpose. Also, due to the non-sensitivity of the pixel locations to electronic fluctuations in a charge coupled device (CCD) camera, this type of camera is preferred. Nonetheless, other non-CCD cameras such as solid-state or vidicon cameras are contemplated to be within the scope of this invention.

Preferably, the reference reflector 24 is placed on the cover plate 26 or image receiving surface 30 and oriented until the reference portion 40 of the image receiving surface 30 is located essentially at the optical center of curvature 32 of the reference reflector 24. This may require spacers to be used depending on the configuration of the reference reflector 24. It should be noted that the reference portion 40 may be defined prior to the positioning of the reference reflector 24 or alternatively, the position of the reference reflector 24 may define the reference portion 40.

Upon positioning the reference portion 40 essentially at the optical center of curvature 32, the reference reflector 24 is secured to the video camera 28. Also, the reference reflector 24 is preferably secured to the video camera 28 concentrically with respect to the image receiving surface 30. In this way, the reference portion 40 is located approximately at the center of the image receiving surface 30.

Although a number of satisfactory means for securing the reference reflector 24 to the video camera 28 are available, in the preferred embodiment optical cement is used. In this way, the reference reflector 24 is rigidly fixed to the alignment camera 28 but prior to the cement setting up, the reference reflector 24 is easily positionable to the desired location on the image receiving surface 34 or cover plate 26.

The operation of the present invention will now be described in greater detail. Initially, the video camera 28 and the reference reflector 24 are moved as a unit towards the optical axis 50 to position the image 34 on the image receiving surface 30. Upon positioning the image 34 on the image receiving surface 30, the image 34 is communicated to the display monitor 36 where it is observable on the screen 42.

Referring to FIGS. 2 through 6, as the image receiving surface 30 receives radiation 12, the image 34 is formed thereon and communicated to the display monitor 36 by the cable 38. By moving the video camera 28 and the reference reflector 24 as a unit axially along the optical axis 50, the image 34 can be focused on the image receiving surface 30. By moving the video camera 28 and reference reflector 24 as a unit radially with respect to the optical axis 50, the image 34 is caused to move about the image receiving surface 30.

Focusing is observable on the screen 42 of the display monitor 36 by noting the size of the image 34 changing. As the size of the more focused. It becomes more focused. Contrawise, as the size of the image 34 enlarges, it becomes less focused. Therefore, when the size of the image 34 is minimized, the image 34 is properly focused.

It should be noted that proper focusing is achieved by positioning the image receiving surface 30 along the optical axis 50 at the focal point 22. Thus, by moving the video camera 28 and reference reflector 24 as a unit and observing the size of the image 34 displayed by the monitor 36, the image receiving surface 30 may be placed at the focal point 22.

Figure 4A:
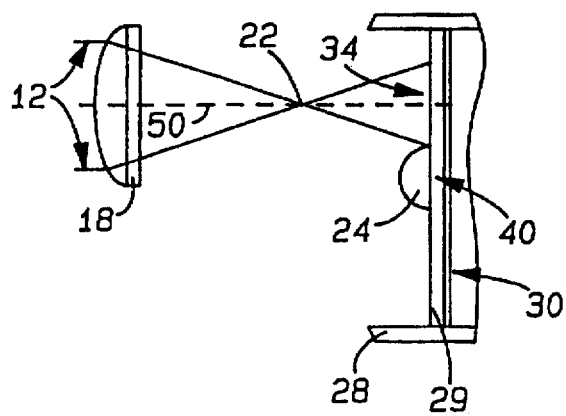
FIG. 4a is a top schematic view of an element to be tested and an image receiving surface prior to focusing an image on the image receiving surface and prior to positioning the image to the reference portion according to the present invention.

Turning now particularly to FIGS. 4, 5 and 6, various stages of alignment are shown as the video camera 28, image receiving surface 30 and reference reflector 24 are moved as a unit axially and radially with respect to the optical axis 50. In this way, the reference portion 40, and thus the optical center of curvature 32, are positionable to the focal point 22. In FIG. 4a, the lens 18 converges the radiation 12 to the focal point 22. The radiation 12 diverges again and strikes the image receiving surface 30 forming an image 34 thereon.

Figure 4B:
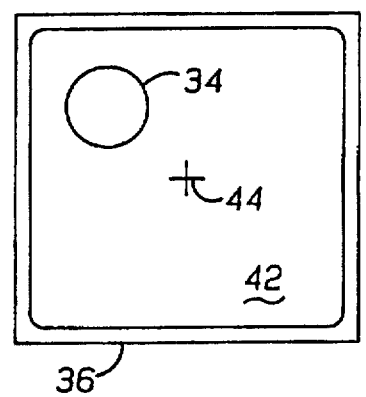

As shown in FIGS. 4a and 4b, the optical center of curvature 32 of the reference reflector 24 is not properly aligned with the focal point 22. As shown in FIG. 4a, the image 34 is out of focus and displaced from the reference portion 40. In FIG. 4b, this misaligned condition is observable on the screen 42 by noting the relatively large image 34 displaced from the alignment mark 44.

Figure 5A:
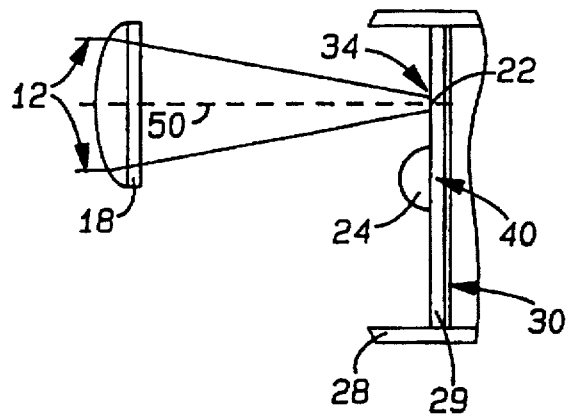
FIG. 5a is a top schematic view of an element to be tested and an image receiving surface after focusing an image on the image receiving surface but prior to positioning the image to the reference portion according to the present invention.
Figure 5B:
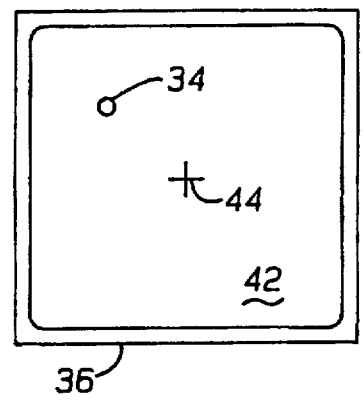

In FIG. 5a, the camera 28 and image receiving surface 30 have been moved as a unit axially along the optical axis 50 to focus the image 34 on the image receiving surface 30. Thus, although the image 34 is focused on the image receiving surface 30, it remains displaced from the reference portion 40. As shown in FIG. 5b, the misaligned but focused image 34 is observable on the screen 42 as a relatively small image 34 displaced from the alignment mark 44.

Figure 6A:
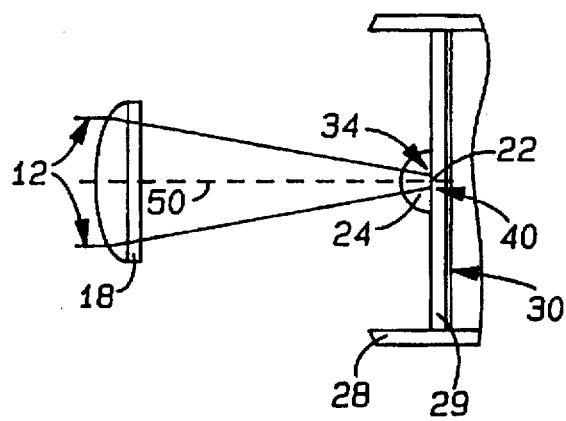
FIG. 6a is a top schematic view of an element to be tested and an image receiving surface after focusing an image on the image receiving surface and after positioning the image to the reference portion according to the present invention.
Figure 6B:
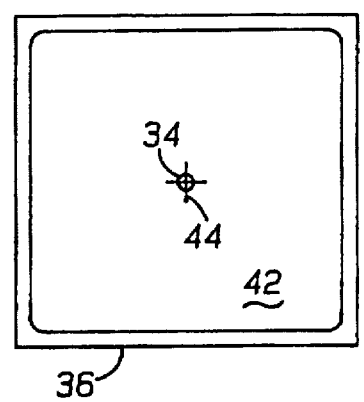

Referring now to FIGS. 6a and 6b, the video camera 28 and reference reflector 24 have been moved as a unit radially to the optical axis 50 to position the focused image 34 on the alignment mark 44. After focusing and positioning the image 34 on the alignment mark 44, the reference portion 40 is located at the focal point 22. Additionally, since the reference portion 40 is also located at the optical center of curvature 32 of the reference reflector 24, the optical center of curvature 32 is coincident with the focal point 22. Hence, the reference reflector 24 in FIG. 5a is properly aligned. Although the above alignment steps have been described in a particular sequence, it is to be understood that the steps may occur in any order or essentially simultaneously.

Due to the optical behavior of some reference reflectors 24, the image receiving surface 30 may not receive the radiation 12 over its entire surface. Rather, the image 34 may be obscured by the reference reflector 24. Accordingly, the image 34 is not continuously visible on the screen 42. This is particularly true for opaque reference reflectors 24 or those having a different optical index from the cover plate 26. However, by noting the position of the image 34 when it is last visible on the screen 42 and the position of the image 34 when it is again visible, proper alignment can be easily achieved.

Referring to FIGS. 7, 8 and 9, the screen 42 of the display monitor 36 and the image receiving surface 30 of the video camera 28 are shown during various stages of alignment. As described above, the image 34 is focusable and positionable to the alignment mark 44 of the screen 42, and consequently to the reference portion 40 of the image receiving surface 30, by moving the video camera 28 axially and radially with respect the optical axis 50 (not shown). Thus, the camera 28 and reference reflector 24 are moved as a unit to maneuver the image 34 along a path towards the alignment mark 44.

In FIGS. 7a, 8a and 9a the image 34 is shown as it is maneuvered across the screen 42. By radially moving the camera 28 and the reference reflector 24 as a unit, the image 34 may be maneuvered, for example, to track along the Y axis. In FIG. 7a, as the image 34 reaches the alignment mark 44, position Y1, it begins to appear slightly obscured. This is observable by noting the partial image 34 on the screen 42. As can be seen in FIG. 7b, this condition is caused by the image 34 being located partially on the reference reflector 24 and partially on the image receiving surface 30.

Continuing radial movement of the video camera 28 and reference reflector 24 as a unit, the image 34 is caused to track along the Y axis. During this maneuvering, the image 34 momentarily disappears from the screen 42 and then partially reappears. As shown in FIG. 8a, when the image 34 reappears, it is visible on the screen 42 at Y2 in an obscured form. This is observable by noting the partial image 34 on the screen 42. As shown in FIG. 8b, this condition is caused by the image 34 partially contacting both the image receiving surface 30 and the reference reflector 24.

To align the image 34 with the alignment mark 44 properly, the video camera 28 and the reference reflector 24 are moved as a unit to position the image 34 at the midpoint of the locations where the image 34 was last visible and where the image 34 was first visible again. In other words, image 34 is maneuvered to the position Y2–Y1. As shown in FIG. 9a, at the position Y2–Y1, the image 34 is totally obscured and not visible on the display monitor 36. As can be seen in FIG. 9b, this is caused by positioning the image 34 completely on the reference reflector 24.

To alleviate obscuring, the reference reflector 24 may be constructed of a material at least partially transmitting or having the same optical index as the protective cover plate 26. In this way, the image 34 is not obscured by the reference reflector 24 and the image receiving surface 30 receives the image 34 over its entire surface area including the range wherein the image 34 is located on the reference reflector 24. The image 34 is then viewable on the screen 42 continuously and alignment can simply be achieved by moving the camera 28 and the reference reflector 24 as a unit to focus and position the image 34 on the alignment mark 44.

Thus, it can be appreciated that the present invention provides a means for quickly and easily locating the focal point of an element or optical system to be tested and positioning the optical center of curvature of a reference reflector thereto. Also, the complexity and difficulty of moving two separate devices is alleviated. Furthermore, the time required to properly align the reference reflector is decreased and the skill and experience required to obtain proper alignment is reduced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A reference reflector alignment apparatus comprising:

a video camera having an image receiving surface;

a reference reflector having an optical center of curvature, said reference reflector being secured to said video camera such that a portion of said image receiving surface is located essentially at said optical center of curvature; and a video monitor coupled to said camera; said video camera and said reference reflector being movable as a unit to position said optical center of curvature coincident with a focal point of an object to be tested.

2. The apparatus of claim 1 wherein said reference reflector is secured to an image plate supporting said image receiving surface.

3. The apparatus of claim 1 wherein said reference reflector is secured to a cover plate covering said image receiving surface.

4. The apparatus of claim 1 wherein said monitor includes alignment indicia coordinately positioned with said portion of said image receiving surface.

5. The apparatus of claim 1 wherein said reference reflector is secured to said video camera with optical cement.

6. The alignment camera of claim 1 wherein said monitor includes an alignment assisting grid.

7. The alignment camera of claim 1 wherein said monitor includes cross hairs.

8. The alignment camera of claim 1 wherein said video camera is a CCD camera.

9. An optical system comprising:

at least one optical element;

an interferometer for testing said at least one optical element;

a video camera having an image receiving surface;

a reference reflector having an optical center of curvature, said reference reflector being secured to said video camera such that a reference portion of said image receiving surface is located essentially at said optical center of curvature;

a video monitor coupled to said video camera for displaying an image received at said image receiving surface; and said video monitor including reference indicia coordinately positioned with said reference portion of said image receiving surface;

said video camera and said reference reflector being movable as a unit to position said optical center of curvature coincident with a focal point of said at least one optical element.

10. The alignment camera of claim 9 wherein said reference reflector is secured to a cover plate covering said image receiving surface.

11. The alignment camera of claim 10 wherein said reference reflector has the same optical index as said cover plate.

12. The alignment camera of claim 9 wherein said reference reflector is secured to an image plate supporting said image receiving surface.

13. A method of aligning a reference reflector comprising the steps of:

providing a video camera having an image receiving surface;

securing a reference reflector having an optical center of curvature to said video camera such that a reference portion of said image receiving surface is located essentially at said optical center of curvature;

coupling a video monitor to said video camera for displaying an image received at said image receiving surface;

causing radiation to strike an object to be tested thereby forming an image;

moving said video camera and reference reflector as a unit to cause said radiation to strike said image receiving surface; and moving said video camera and reference reflector as a unit to focus and position said image to said reference portion of said image receiving surface.

14. The method of claim 13 wherein said moving comprises the steps of:

moving said video camera to minimize said image on said video monitor;

further moving said video camera to position said image at an alignment indicia coordinately positioned on said video monitor with said reference portion of said image receiving surface.

* * * * *